Figure 1:
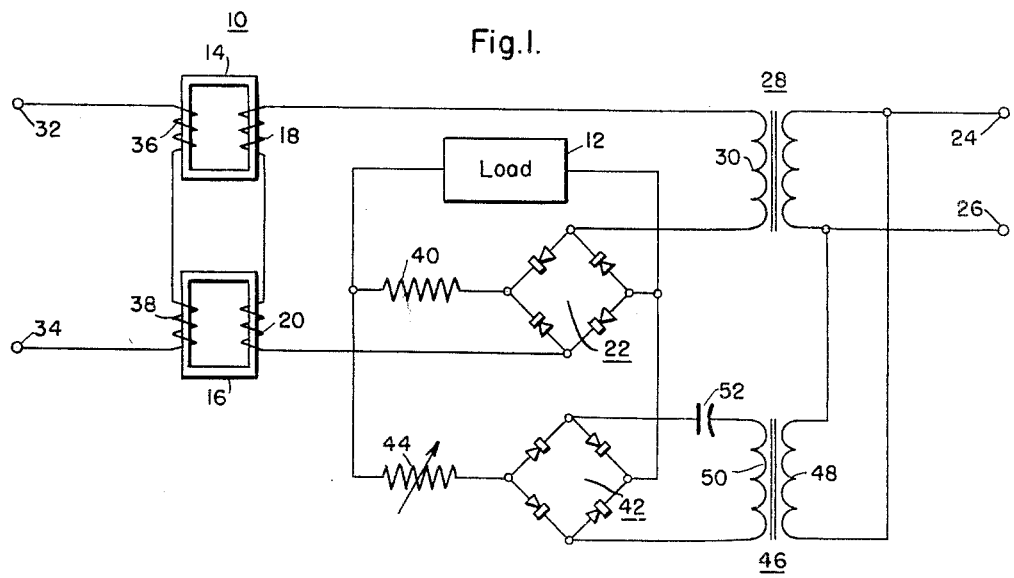

United States Patent Office 2,763,828
Patented Sept. 18, 1956

2,763,828

MAGNETIC AMPLIFIER

Clifford J. Jensen, Pittsburgh, Pa., assignor to Westinghouse Electric Corporation, East Pittsburgh, Pa., a corporation of Pennsylvania Application May 27, 1953, Serial No. 357,850

11 Claims. (Cl. 321—25)

This invention relates to saturable reactors and more particularly to saturable reactors which produce substantially zero output when the input control signal to the saturable reactor is of zero magnitude and to saturable reactors which produce an output voltage of reversible polarity.

Unless some means is provided for compensating or rendering ineffective the quiescent current that flows in a saturable reactor, the output voltage of the saturable reactor will not be of zero magnitude when zero current flows through the saturable reactor's control winding. However, many applications of saturable reactors require zero output voltage when the input control current is of zero magnitude. In the past, different types of apparatus have been utilized to annul or compensate for this effect of the quiescent current. One such prior art apparatus comprises duplicate reactors, one including the direct current control winding and the other reactor being a dummy and having a core substantially identical to the core of its associated reactor. The output from these substantially identical reactors is magnetically mixed within a transformer, thus rendering ineffective the quiescent current.

Other prior art apparatus for rendering the quiescent current ineffective comprises an autotransformer placed in a bridge circuit with the saturable reactor. However, both of the above-mentioned prior art means for rendering the quiescent current ineffective are not positive methods in obtaining an absolute zero output from the saturable reactor since the current from the compensating device seldom matches the phase, magnitude and wave form of the saturable reactor quiescent current. As a result, an absolute zero output from the saturable reactor is not obtained. In addition, the use of a substantially identical dummy reactor increases the cost of the overall apparatus.

An object of this invention is to provide for rendering the quiescent current of a saturable reactor ineffective to thus produce substantially zero reactor output voltage to the load when the input control signal to the saturable reactor is of zero magnitude, by passing direct current of predetermined magnitude through an output series circuit including the saturable reactor's load rectifier so as to produce a voltage drop across the series circuit of substantially equal magnitude and of opposite polarity to the output voltage of the rectifier minus the voltage drop across the load, to thereby produce substantially zero output voltage across the series circuit.

Another object of this invention is to provide for obtaining substantially zero output voltage from a saturable reactor to a load irrespective of the magnitude and frequency of the input voltage to the saturable reactor and irrespective of the temperature of the air surrounding the saturable reactor, by rendering both the load rectifier of the saturable reactor and a compensating rectifier responsive to the input voltage to the saturable reactor and by so connecting the compensating rectifier and a resistor in shunt with the load rectifier output circuit that when the direct-current control signal to the saturable reactor is of zero magnitude current flows from the compensating rectifier through the load rectifier output circuit to thereby produce a voltage drop thereacross of substantially equal magnitude and of opposite polarity to the direct-current output voltage of the load rectifier, minus the voltage drop across the load, to thereby produce substantially zero voltage across the load rectifier output circuit.

A further object of this invention is to provide for reversing the polarity of the output voltage of a saturable reactor in accordance with the polarity of its direct-current control signal, by biasing the saturable reactor a predetermined amount and then compensating for the direct-current output from the saturable reactor's load rectifier, as produced by the biasing action and the saturable reactor's quiescent current.

Figure 2:
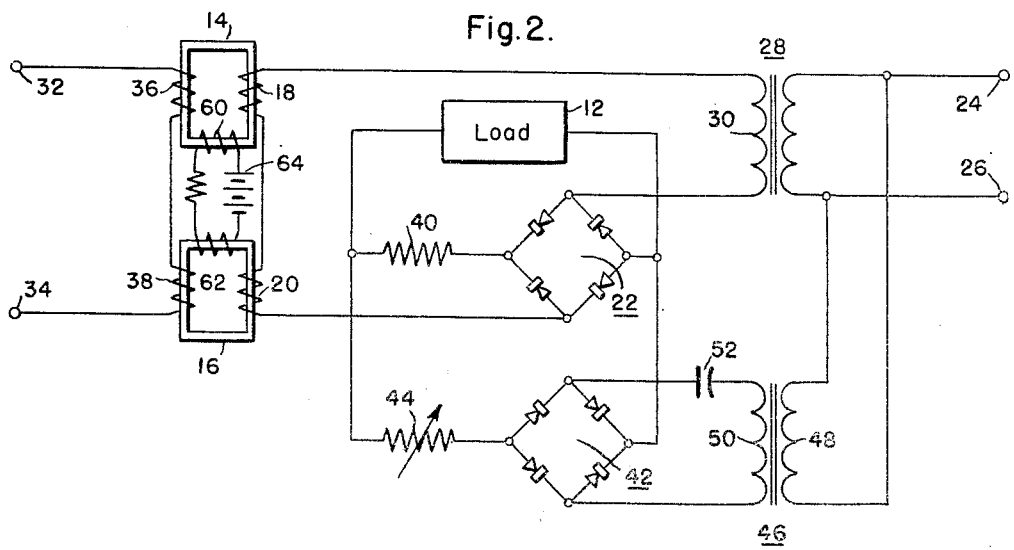

Other objects of this invention will become apparent from the following description when taken in conjunction with the accompanying drawing, in which:

Figure 1 is a schematic diagram of a saturable reactor embodying a teaching of this invention and in which means is provided for producing zero output from the saturable reactor when the input control signal to the saturable reactor is of zero magnitude; and Fig. 2 is a schematic diagram of another embodiment of this invention illustrating a saturable reactor which produces an output voltage of reversible polarity.

Referring to Fig. 1 of the drawing there is illustrated a series connected simple saturable reactor 10 which produces zero output voltage across a load 12 when the input control signal to the saturable reactor 10 is of zero magnitude. As illustrated, the saturable reactor 10 comprises two rectangular core members 14 and 16 constructed of magnetic core material. Load windings 18 and 20 are disposed in inductive relationship with the core members 14 and 16, respectively.

In order to render a load rectifier 22, which in this instance is a full-wave dry-type rectifier, responsive to the current flow through the load windings 18 and 20, the load rectifier 22 is connected in circuit relationship with the load windings 18 and 20 and with a source of alternating current (not shown) which is connected to the terminals 24 and 26. In particular, a potential transformer 28, having a secondary winding 30, is responsive to the alternating current as applied to the terminals 24 and 26. The load windings 18 and 20 are rendered responsive to the voltage across the secondary winding 30 of the transformer 28 by connecting the load windings 18 and 20 in series circuit relationship with one another, one end of the series circuit being connected to one side of the secondary winding 30 and the other end of the series circuit being connected to one of the input terminals of the rectifier 22. The energizing circuit for the load windings 18 and 20 is completed by connecting the other side of the secondary winding 30 to the other input terminal of the rectifier 22.

For the purpose of controlling the impedance of the load windings 18 and 20, and thus the magnitude of the current flow therethrough, in accordance with the magnitude of a variable direct-current voltage applied to the terminals 32 and 34, control windings 36 and 38 are disposed in inductive relationship with the core members 14 and 16, respectively. As illustrated, the control windings 36 and 38 are connected in series circuit relationship with one another, one end of the series circuit being connected to the terminal 32 and the other end of the series circuit being connected to the terminal 34. As is customary, the load windings 18 and 20 and the control windings 36 and 38 are so disposed on their respective core members that any current tending to be induced in the control windings 36 and 38 by the alternating current flowing through the load windings 18 and 20 is cancelled out.

In accordance with the teachings of this invention zero output voltage is produced across the load 12, when the current flow through the control windings 36 and 38 is of zero magnitude, by passing a predetermined amount of direct current through a series circuit including the load rectifier 22 and a resistor 40. The passage of such a current flow through the series circuit including the load rectifier 22 and the resistor 40 is accomplished by connecting another series circuit, including a compensating rectifier 42 and an element having resistance, in particular a variable resistor 44, in parallel circuit relationship with the series circuit including the load rectifier 22 and the resistor 40. By so connecting the compensating rectifier 42 and the resistor 44, direct current flows from the output of the compensating rectifier 42 through the series circuit including the load rectifier 22 and the resistor 40 to thereby produce a voltage drop across the series circuit including the load rectifier 22 of opposite polarity and substantially equal to the direct current output voltage of the load rectifier 22 minus the load 12 voltage drop for zero saturable reactor control current, to thus produce substantially zero voltage across the series circuit including the load rectifier 22 and the resistor 40 when the direct-current flow through the control windings 36 and 38 is of zero magnitude. Since the series circuit including the load rectifier 22 and the resistor 40 is connected across the load 12 the voltage across the load 12 is of zero magnitude when the direct-current flow through the control windings 36 and 38 is of zero magnitude. As a matter of fact, while no simplified treatment of a mesh network such as that in question can be rigorously true, it is thought that a better simplified view of the operation of the circuit in question is that the rectified output circuit of auxiliary transformer 46 is so adjusted, for zero saturable reactor control winding (36, 38) current, that the rectified current through load 12 of auxiliary transformer 46 is equal and opposite to the rectified current supplied to load 12 by main power transformer 28.

The function of the variable resistor 44 is twofold. First, the resistor 44 presents a high impedance to the flow of direct current from the output of the load rectifier 22, to thus prevent impairment of the gain of the saturable reactor 10. Second, by adjusting the variable resistor 44, the correct amount of direct current flow through the series circuit including the load rectifier 22 and the resistor 40 can be obtained to thereby produce a voltage of zero magnitude across the load 12 when the current flow through the control windings 36 and 38 is of zero magnitude. From the foregoing it can be seen that in practice the impedance of the resistor 44 must be high compared to the impedance of the load 12 in order to prevent impairment of the gain of the saturable reactor 10.

Although the resistor 40 is shown as comprising a part of the series circuit including the load rectifier 22 and the resistor 40, this series circuit can comprise only the load rectifier 22. When the resistor 40 is omitted, the necessary voltage drop across the series circuit including the load rectifier 22 for opposing the direct-current output voltage of the load rectifier 22 is produced primarily across the load rectifier 22.

In order to render the compensating rectifier 42 responsive to the alternating-current voltage applied to the terminals 24 and 26, a potential transformer 46, having a primary winding 48 and a secondary winding 50, is interconnected between the terminals 24 and 26 and the input terminals of the compensating rectifier 42. In particular, one end of the primary winding 48 is connected to the terminal 24 and the other end of the primary winding 48 is connected to the terminal 26. On the other hand, the secondary winding 50 of the transformer 46 is connected to the input terminals of the compensating rectifier 42 by circuit means including frequency compensating means, in this instance, a capacitor 52. However, it is to be understood that other suitable frequency compensating means (not shown) could be substituted by one skilled in the art for the capacitor 52. By providing the frequency compensating means 52, the saturable reactor 10 is capable of providing zero output voltage across the load 12 when the current flow through the control windings 36 and 38 is of zero magnitude, even though the frequency of the alternating-current voltage applied to the terminals 24 and 26 varies in magnitude. For instance, if the frequency of the alternating-current voltage applied to the terminals 24 and 26 increases to thereby increase the direct-current output voltage of the load rectifier 22, the capacitor 52 effects a proportional increase in the output voltage of the compensating rectifier 42 to thereby offset the increase in the output voltage of the load rectifier 22. In like manner, with a decrease in the frequency of the alternating-current voltage applied to the terminals 24 and 26, the capacitor 52 effects a decrease in the direct-current output voltage of the compensating rectifier 42 to thus offset a corresponding decrease in the direct-current output voltage of the load rectifier 22.

It is to be noted that by rendering the load rectifier 22 and the compensating rectifier 42 responsive to the same alternating-current voltage, as applied to the terminals 24 and 26, the compensating effect produced by the resistor 44 and the compensating rectifier 42 is substantially unaffected by changes in the magnitude of the alternating-current voltage applied to the terminals 24 and 26. For instance, with an increase in the magnitude of the voltage applied to the terminals 24 and 26, this increased voltage effects an increase in the direct-current output voltages of both the load rectifier 22 and the compensating rectifier 42. Likewise, a decrease in the magnitude of the voltage applied to the terminals 24 and 26 effects a like decrease in the direct-current output voltages of both the load rectifier 22 and the compensating rectifier 42.

At low power levels, the efficiency of a load rectifier is exceedingly sensitive to changes in the temperature of the surrounding air. However, in the apparatus illustrated in Fig. 1, the compensating rectifier 42 is constructed so as to have characteristics similar to the load rectifier 22. Therefore, with changes in the temperature of the air surrounding the saturable reactor 10, like changes occur in the efficiencies of the rectifiers 22 and 42 to thereby render the compensating effect produced by the resistor 44 and the compensating rectifier 42 substantially independent of the temperature of the air surrounding the saturable reactor 10.

Referring to Fig. 2 there is illustrated another embodiment of the teachings of this invention in which like components of Figs. 1 and 2 have been given the same reference characters. The main distinction between the apparatus illustrated in Figs. 1 and 2 is that in the apparatus of Fig. 2 the saturable reactor is capable of producing a direct-current voltage across the load 12 of reversible polarity. This is accomplished by disposing biasing windings 60 and 62 in inductive relationship with the core members 14 and 16, respectively, and properly connecting the biasing windings 60 and 62 to a suitable source of substantially constant direct-current voltage 64.

In particular, the biasing windings 60 and 62 are connected in series circuit relationship with one another, one end of the series circuit being connected to one side of the source of direct-current voltage 64 and the other end of the series circuit being connected to the other side of the source 64. The biasing windings 60 and 62 are so disposed with respect to the control windings 36 and 38, respectively, that when current flows through the control windings 36 and 38 in one given direction, the flux produced by the current flow through the biasing windings 60 and 62 opposes the flux produced by the current flow through the control windings 36 and 38, respectively. However, when current flows in the opposite direction through the control windings 36 and 38, the current flow through the biasing windings 60 and 62 produces a flux which is additive to the flux produced by the current flow through the control windings 36 and 38, respectively.

In operation, when the current flow through the control windings 36 and 38 is of zero magnitude, the biasing windings 60 and 62 move the operation of the saturable reactor, illustrated in Fig. 2, to a point halfway up the saturable reactor's transfer curve. Thus, the direct-current output voltage of the load rectifier 22 illustrated in Fig. 2 is of comparatively greater magnitude than the output voltage of the load rectifier 22 illustrated in Fig. 1 when its associated control windings 36 and 38 have no current flow therethrough. However in the apparatus of Fig. 2, the output voltage of the compensating rectifier 42 and the magnitude of the resistance of the resistor 44 are such as to produce a voltage drop across the load rectifier 22 and the resistor 40 of equal magnitude and of opposite polarity to the output voltage of the load rectifier 22 minus the voltage drop across the load 12 for zero saturable reactor control current, to thereby produce substantially no average voltage across the load 12 when the current flow through the control windings 36 and 38 is of zero magnitude.

In operation, if the direct-current voltage across the terminals 32 and 34 is of such polarity that current flows from the terminal 32 through the control windings 36 and 38 to the terminal 34, the magnetic saturation of the core members 14 and 16 is increased to thereby increase the magnitude of the current flow through the load windings 18 and 20. With an increase in the magnitude of the current flow through the load windings 18 and 20, current flows through the load 12 in such a direction that the left end of the load 12, as illustrated in Fig. 2, is at a positive polarity.

On the other hand, if the direct-current voltage across the terminals 32 and 34 reverses its polarity so that current flows from the terminal 34 through the control windings 38 and 36 to the terminal 32, the magnetic saturation of the core members 14 and 16 is decreased to thereby increase the impedance of the load windings 18 and 20 to thus decrease the current flow therethrough. With a decrease in the current flow through the load windings 18 and 20, current will flow in the opposite direction through the load 12 so that the right end of the load 12, as illustrated in Fig. 2, is at a positive polarity.

It is to be noted that at low current values through selenium rectifiers, such as the rectifiers 22 and 42, a linear output is not obtained from such selenium rectifiers. However, in the apparatus illustrated in Fig. 2, the rectifiers 22 and 42 have considerable current flow therethrough when the voltage across the load 12 is of zero magnitude. Therefore, the rectifiers 22 and 42 illustrated in Fig. 2 can operate in their linear range of output voltage.

It is to be understood that in the apparatus illustrated in Fig. 2 a maximum of power output from the saturable reactor illustrated in Fig. 2 appears at the load 12. The percentage of this power output from the saturable reactor illustrated in Fig. 2 that appears at the load 12 is determined by the resistance ratio between the resistor 44 and the series circuit including the resistor 40 and the load rectifier 22. If the resistance value of the resistor 44 is high compared to the resistance value of the series circuit including the resistor 40 and the load rectifier 22 a high percentage of the power output from the saturable reactor illustrated in Fig. 2 appears at the load 12.

It is to be understood that although a simple series connected saturable reactor is illustrated for the apparatus of Figs. 1 and 2, a parallel connected simple saturable reactor could be substituted for the saturable reactors illustrated. Such a parallel connected simple saturable reactor would be just as suitable as the series connected simple saturable reactors illustrated. A self-saturating magnetic amplifier could also be substituted for the simple saturable reactors illustrated in Figs. 1 and 2. However, since the quiescent current of a self-saturating magnetic amplifier does not vary linearly with changes in the magnitude of the input voltage to the self-saturating magnetic amplifier, the voltage across the load connected to the output of the self-saturating magnetic amplifier (not shown) would not remain at zero magnitude with changes in the magnitude of the input voltage to the self-saturating magnetic amplifier (not shown). It is desirable that the quiescent current of the saturable reactor vary linearly with changes in the magnitude of its input voltage since the output voltage from a rectifier such as the compensating rectifier 42 varies linearly with such a change and therefore should be matched with a linear output from such as the load rectifier 22 illustrated in Figs. 1 and 2.

It is also to be understood that a three-legged core member (not shown) could be substituted by one skilled in the art for the core members 14 and 16 illustrated in Figs. 1 and 2. Although not preferred an inductance member (not shown) could be substituted for the resistor 44 illustrated in Figs. 1 and 2, the resistance effect of the inductance member substituted being utilized to perform the desired effect in operation.

The apparatus embodying the teachings of this invention has several advantages. For instance, the apparatus illustrated in Figs. 1 and 2 is simple in construction, is economical, and comprises static components. In addition, substantially zero voltage is produced across the load 12 when the current flow through the control windings 36 and 38 is of zero magnitude even though the magnitude and/or the frequency of the voltage applied to the terminals 24 and 26 varies over a wide range, in the case of the magnitude over a four to one variation, and even though the temperature of the air surrounding the saturable reactors illustrated in Figs. 1 and 2 varies in magnitude. Further, the efficiency of the apparatus illustrated in Figs. 1 and 2 is not seriously impaired by the provision of the compensating apparatus embodying the teachings of this invention.

Since numerous changes may be made in the above-described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In a saturable reactor disposed to be connected to a source of alternating current which supplies energy to a load, the combination comprising, magnetic core means, two load windings disposed in inductive relationship with the magnetic core means, a control winding for receiving direct current, the control winding being disposed in inductive relationship with the magnetic core means, a series circuit including a load rectifier, the load rectifier being connected in circuit relationship with said load windings and with the source of alternating current so that the load rectifier is responsive to the current flow through the said load windings, the load being connected across the series circuit including the load rectifier, another series circuit including an element having resistance and a source of direct-current voltage, said another series circuit being so connected to the series circuit including the load rectifier that when the magnitude of the direct-current flow through said control winding is of zero magnitude, current flows from said source of direct-current voltage through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude.

2. In a saturable reactor disposed to be connected to a source of alternating current which supplies energy to a load, the combination comprising, magnetic core means, two load windings disposed in inductive relationship with the magnetic core means, a control winding for receiving direct current, the control winding being disposed in inductive relationship with the magnetic core means, a series circuit including a load rectifier, the load rectifier being connected in circuit relationship with said load windings and with the source of alternating current so that the load rectifier is responsive to the current flow through the said load windings, the load being connected across the series circuit including the load rectifier, another series circuit including an element having resistance and a source of direct-current voltage, said another series circuit being connected in parallel circuit relationship with the series circuit including the load rectifier so that when the magnitude of the direct current flow through said control winding is of zero magnitude current flows from said source of direct-current voltage through the series circuit including the load rectifier to thereby produce a voltage drop across the series circuit including the load rectifier of substantially equal magnitude and opposite polarity to the direct-current output voltage of the load rectifier minus the voltage drop across the load, to thus produce substantially zero voltage across the series circuit including the load rectifier when the magnitude of the direct-current flow through the said control winding is of zero magnitude.

3. In a saturable reactor disposed to be connected to a source of alternating current which supplies energy to a load, the combination comprising, magnetic core means, two load windings disposed in inductive relationship with the magnetic core means, a control winding for receiving direct current, the control winding being disposed in inductive relationship with the magnetic core means, a series circuit including a load rectifier, the load rectifier being connected in circuit relationship with said load windings and with the source of alternating current so that the load rectifier is responsive to the current flow through the said load windings, the load being connected across the series circuit including the load rectifier, another series circuit including a compensating rectifier and an element having resistance, the input of said compensating rectifier being responsive to said source of alternating current and said another series circuit being so connected to the series circuit including the load rectifier that when the magnitude of the direct current flow through said control winding is of zero magnitude current flows from the output of the said compensating rectifier through the series circuit including the load rectifier to thereby produce a voltage drop across the series circuit including the load rectifier of substantially equal magnitude and opposite polarity to the direct-current output voltage of the load rectifier minus the voltage drop across the load, to thus produce substantially zero voltage across the series circuit including the load rectifier when the magnitude of the direct current flow through the said control winding is of zero magnitude.

4. In a saturable reactor disposed to be connected to a source of alternating current, the combination comprising, magnetic core means, two load windings disposed in inductive relationship with the magnetic core means, a control winding for receiving direct current, the control winding being disposed in inductive relationship with the magnetic core means, a transformer, the input of the transformer being connected to the source of alternating current, a series circuit including a load rectifier, the load rectifier being connected in circuit relationship with said load windings and with the output of said transformer so that the load rectifier is responsive to the current flow through said load windings, another series circuit including a compensating rectifier and an element having resistance, another transformer, the input of said another transformer being connected to said source of alternating current, the output of said another transformer being connected to the input of said compensating rectifier, said another series circuit being connected in parallel circuit relationship with the series circuit including the load rectifier so that when the magnitude of the direct current flow through said control winding is of zero magnitude substantially zero voltage is produced across the series circuit including the load rectifier.

5. In a saturable reactor disposed to be connected to a source of alternating current which supplies energy to a load, the combination comprising, magnetic core means, two load windings disposed in inductive relationship with the magnetic core means, a control winding for receiving direct current, the control winding being disposed in inductive relationship with the magnetic core means, a transformer, the input of the transformer being connected to said source of alternating current, a series circuit including a load rectifier, the load rectifier being connected in circuit relationship with said load windings and with the output of said transformer so that the load rectifier is responsive to the current flow through the said load windings, the load being connected across the series circuit including the load rectifier, another series circuit including a compensating rectifier and a resistor, another transformer, the input of said another transformer being connected to said source of alternating current, circuit means including frequency compensating means for connecting the output of said another transformer to the input of said compensating rectifier, said another series circuit being connected in parallel circuit relationship with the series circuit including the load rectifier so that when the magnitude of the direct current flow through said control winding is of zero magnitude current flows from the output of the said compensating rectifier through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude.

6. In a reversible saturable reactor for supplying energy to a load and being disposed to be connected to a source of alternating current, the combination comprising, magnetic core means, two load windings disposed in inductive relationship with the magnetic core means, a control winding for receiving a direct-current control signal, the control winding being disposed in inductive relationship with the magnetic core means, a biasing winding disposed in inductive relationship with the magnetic core means and responsive to direct current, a series circuit including a load rectifier, the load rectifier being connected in circuit relationship with said load windings and with said source of alternating current so that the load rectifier is responsive to the current flow through the said load windings, the load being connected across the series circuit including the load rectifier, and another series circuit including a source of direct-current voltage and an element having resistance, said another series circuit being so connected to the series circuit including the load rectifier that when the magnitude of the direct current flow through said control winding is of zero magnitude current flows from said source of direct-current voltage through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude, so that the polarity of the voltage produced across the load is determined by the direction of the current flow through the said control winding.

7. In a reversible saturable reactor for supplying energy to a load and being disposed to be connected to a source of alternating current, the combination comprising, magnetic core means, two load windings disposed in inductive relationship with the magnetic core means, a control winding for receiving a direct-current control signal, said control winding being disposed in inductive relationship with the magnetic core means, a biasing winding disposed in inductive relationship with the magnetic core means and responsive to direct-current, a series circuit including a load rectifier, the load rectifier being connected in circuit relationship with said load windings and with said source of alternating current so that the load rectifier is responsive to the current flow through the said load windings, the load being connected across the series circuit including the load rectifier, and another series circuit including a source of direct-current voltage and an element having resistance, said another series circuit being connected in parallel circuit relationship with the series circuit including the load rectifier so that when the magnitude of the direct current flow through the said control winding is at zero magnitude current flows from said source of direct-current voltage through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude, so that the polarity of voltage across the load is determined by the direction of the current flow through the said control winding.

8. In a reversible saturable reactor for supplying energy to a load and being disposed to be connected to a source of alternating current, the combination comprising, magnetic core means, two load windings disposed in inductive relationship with the magnetic core means, a control winding for receiving a direct-current control signal, the control winding being disposed in inductive relationship with the magnetic core means, a biasing winding disposed in inductive relationship with the magnetic core means and responsive to direct current, a series circuit including a load rectifier, the load rectifier being connected in circuit relationship with said load windings and with said source of alternating current so that the load rectifier is responsive to the current flow through the said load windings, the load being connected across the series circuit including the load rectifier, and another series circuit including a compensating rectifier and an element having resistance, the input of said compensating rectifier being connected to the said source of alternating current, said another series circuit being so connected to the series circuit including the load rectifier that when the magnitude of the direct current flow through said control winding is of zero magnitude current flows from the output of the said compensating rectifier through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude, so that the polarity of the voltage across the load is determined by the direction of the current flow through the said control winding.

9. In a reversible saturable reactor for supplying energy to a load and being disposed to be connected to a source of alternating current, the combination comprising, magnetic core means, two load windings disposed in inductive relationship with the magnetic core means, a control winding responsive to a direct-current control signal, the control winding being disposed in inductive relationship with the magnetic core means, a biasing winding disposed in inductive relationship with the magnetic core means, the biasing winding being responsive to direct current, a series circuit including a load-rectifier, the load rectifier being connected in circuit relationship with said load windings and with said source of alternating current so that the load rectifier is responsive to the current flow through the said load windings, the load being connected across the series circuit including the load rectifier, and another series circuit including a compensating rectifier and an element having resistance, said another series circuit being connected in parallel circuit relationship with the series circuit including the load rectifier so that when the magnitude of the direct current flow through said control winding is of zero magnitude current flows from the output of said compensating rectifier through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude, so that the polarity of the voltage across the load is determined by the direction of the current flow through the said control winding.

10. In a reversible saturable reactor for supplying energy to a load and being disposed to be connected to a source of alternating current, the combination comprising, magnetic core means, two load windings disposed in inductive relationship with the magnetic core means, a control winding responsive to a direct-current control signal, the control winding being disposed in inductive relationship with the magnetic core means, a biasing winding disposed in inductive relationship with the magnetic core means, the biasing winding being responsive to direct current, a transformer, the input of said transformer being connected to said source of alternating current, a series circuit including a load rectifier, the load rectifier being connected in circuit relationship with said load windings and with the output of the said transformer so that the load rectifier is responsive to the current flow through the said load windings, the load being connected across the series circuit including the load rectifier, another series circuit including a compensating rectifier and a resistor, and another transformer, the input of said another transformer being connected to the said source of alternating current and the output of the said another transformer being connected to the input of said compensating rectifier, said another series circuit being connected in parallel circuit relationship with the series circuit including the load rectifier so that when the magnitude of the direct current flow through said control winding is of zero magnitude current flows from the output of the said compensating rectifier through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude, so that the polarity of the voltage across the load is determined by the direction of the current flow through the said control winding.

11. In a reversible saturable reactor for supplying energy to a load and being disposed to be connected to a source of alternating current, the combination comprising, magnetic core means, two load windings disposed in inductive relationship with the magnetic core means, a control winding responsive to a direct-current control signal, the control winding being disposed in inductive relationship with the magnetic core means, a biasing winding disposed in inductive relationship with the magnetic core means and responsive to direct current, a transformer, the input of said transformer being connected to said source of alternating current, a series circuit including a load rectifier, the load rectifier being connected in circuit relationship with said load windings and with the output of the said transformer so that the load rectifier is responsive to the current flow through the said load windings, the load being connected across the series circuit including the load rectifier, another series circuit including a resistor and a compensating rectifier, and another transformer, the input of said another transformer being connected to the said source of alternating current, circuit means including frequency compensating means for connecting the output of the said another transformer to the input of said compensating rectifier, said another series circuit being connected in parallel circuit relationship with the series circuit including the load rectifier so that when the magnitude of the direct current flow through said control winding is of zero magnitude current flows from the output of the said compensating rectifier through the series circuit including the load rectifier to thereby produce a voltage drop across the series circuit including the load rectifier of substantially equal magnitude and of opposite polarity to the direct-current output voltage of the load rectifier minus the voltage drop across the load, to thus produce substantially zero voltage across the series circuit including the load rectifier when the magnitude of the direct current flow through the said control winding is of zero magnitude, so that the polarity of the voltage across the load is determined by the direction of the current flow through the said control winding.

References Cited in the file of this patent

UNITED STATES PATENTS

| | | |
|---|---|---|
| 2,707,262 | Walker et al. | Apr. 26, 1955 |
| 2,721,303 | Silver | Oct. 18, 1955 |